United States Patent
Kobayashi

(10) Patent No.: US 10,017,205 B2
(45) Date of Patent: Jul. 10, 2018

(54) CONTROL APPARATUS AND CONTROL METHOD OF ON-VEHICLE ELECTRONIC EQUIPMENT

(71) Applicant: NSK LTD., Tokyo (JP)

(72) Inventor: Toshihiko Kobayashi, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/312,306

(22) PCT Filed: Sep. 18, 2015

(86) PCT No.: PCT/JP2015/076625
§ 371 (c)(1),
(2) Date: Nov. 18, 2016

(87) PCT Pub. No.: WO2016/047575
PCT Pub. Date: Mar. 31, 2016

(65) Prior Publication Data
US 2017/0088164 A1    Mar. 30, 2017

(30) Foreign Application Priority Data

Sep. 25, 2014  (WO) .................. PCT/JP2014/075396
Jul. 21, 2015  (JP) ................................. 2015-143875

(51) Int. Cl.
B62D 5/04         (2006.01)
(52) U.S. Cl.
CPC ......... *B62D 5/0493* (2013.01); *B62D 5/0463* (2013.01); *B62D 5/0484* (2013.01)
(58) Field of Classification Search
CPC ... B62D 5/0493; B62D 5/0463; B62D 5/0484
(Continued)

(56) References Cited

U.S. PATENT DOCUMENTS 6,697,995 B1 *  2/2004  Yoon ................... G01R 31/006
                                                   700/79
8,831,832 B2 *  9/2014  Hoshi ................. B62D 5/0463
                                                   318/400.23
(Continued)

FOREIGN PATENT DOCUMENTS

JP      6-324914 A     11/1994
JP      10-198584 A    7/1998
(Continued)

OTHER PUBLICATIONS

International Preliminary Report on Patentability for PCT/JP2015/076625 dated May 17, 2016 [PCT/JP/IPEA/409].
(Continued)

*Primary Examiner* — Anne M Antonucci
*Assistant Examiner* — James E Stroud
(74) *Attorney, Agent, or Firm* — Sughrue Mion, PLLC

(57) ABSTRACT

An apparatus and a method that include a program execution monitoring dedicated circuit connected to a CPU of a control apparatus of an on-vehicle electronic equipment that includes an execution time monitoring timer circuit, an execution sequence monitoring comparison circuit, a setting register, an other attached circuit and so on, perform monitoring of an execution sequence of a task executed by a control program of the on-vehicle electronic equipment and/or an execution time from a head address to an end address of the task executed by the control program, and enable the control of the on-vehicle electronic equipment such as an electric power steering apparatus to be continued by performing an alternative processing in the case of detecting an abnormality in the execution sequence and/or the execution time.

20 Claims, 11 Drawing Sheets

(58) Field of Classification Search
USPC .......................................................... 701/43
See application file for complete search history.

(56) References Cited

U.S. PATENT DOCUMENTS

| | | | | |
|---|---|---|---|---|
| 9,164,010 | B2* | 10/2015 | Kuwahara | B62D 5/049 |
| 9,193,386 | B2* | 11/2015 | Wei | B62D 5/0493 |
| 9,348,684 | B2* | 5/2016 | Aoki | G06F 11/0739 |
| 9,407,190 | B2* | 8/2016 | Kumagai | B62D 5/046 |
| 9,457,838 | B2* | 10/2016 | Tsunoda | B62D 5/0484 |
| 9,573,619 | B2* | 2/2017 | Fukunaga | H04Q 9/00 |
| 2002/0022914 | A1* | 2/2002 | Kawada | B62D 5/0493 701/41 |
| 2015/0115740 | A1* | 4/2015 | Miura | H01H 47/00 307/117 |
| 2015/0156144 | A1* | 6/2015 | Srivathsa | H04L 63/0421 709/206 |
| 2015/0175193 | A1* | 6/2015 | Endo | B62D 5/0487 701/29.2 |
| 2015/0226627 | A1* | 8/2015 | Kuwahara | B62D 5/049 701/41 |
| 2015/0239494 | A1* | 8/2015 | Fukunaga | H04Q 9/00 701/43 |
| 2015/0244302 | A1* | 8/2015 | Kumagai | B62D 5/046 318/400.27 |
| 2015/0367881 | A1* | 12/2015 | Tsunoda | B62D 5/0487 701/43 |
| 2016/0257336 | A1* | 9/2016 | Nakamura | B62D 5/04 |
| 2016/0264173 | A1* | 9/2016 | Goto | B62D 5/0481 |
| 2017/0190357 | A1* | 7/2017 | Kobayashi | B62D 6/10 |
| 2017/0190358 | A1* | 7/2017 | Kobayashi | B62D 6/10 |
| 2017/0197655 | A1* | 7/2017 | Kobayashi | B62D 5/0481 |

FOREIGN PATENT DOCUMENTS

| | | |
|---|---|---|
| JP | 2001-175497 A | 6/2001 |
| JP | 2006-90356 A | 4/2006 |
| JP | 2009-113618 A | 5/2009 |
| JP | 2010-184689 A | 8/2010 |
| JP | 2011-150532 A | 8/2011 |
| JP | 2014-26347 A | 2/2014 |

OTHER PUBLICATIONS

International Search Report for PCT/JP2015/076625 dated Dec. 15, 2015 [PCT/ISA/210].

\* cited by examiner

FIG.4

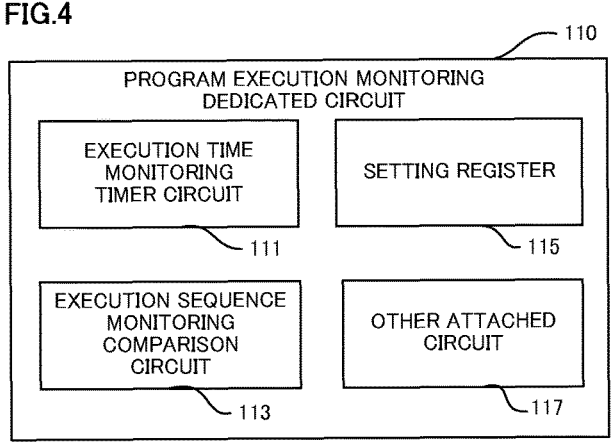

FIG.5

| EXECUTION SEQUENCE | PROCESSING ADDRESS | EXECUTION TIME THRESHOLD |
|---|---|---|
| 1 | HEAD ADDRESS OF PROCESSING 1 | 70[μs] |
| 2 | HEAD ADDRESS OF PROCESSING 2 | 120[μs] |
| 3 | HEAD ADDRESS OF PROCESSING 3 | 200[μs] |
| 4 | HEAD ADDRESS OF PROCESSING 4 | 120[μs] |
| 5 | HEAD ADDRESS OF PROCESSING 5 | 100[μs] |
| 6 | HEAD ADDRESS OF PROCESSING 6 | 20[μs] |
| 7 | HEAD ADDRESS OF PROCESSING 7 | 30[μs] |
| 8 | HEAD ADDRESS OF PROCESSING 8 | 300[μs] |
| 9 | HEAD ADDRESS OF PROCESSING 9 | 50[μs] |
| 10 | HEAD ADDRESS OF PROCESSING 10 | 10[μs] |

FIG.6

| EXECUTION SEQUENCE | NORMAL PROCESSING | EXECUTION TIME THRESHOLD | ALTERNATIVE PROCESSING | ALTERNATIVE PROCESSING'S EXECUTION TIME THRESHOLD |
|---|---|---|---|---|
| 1 | PROCESSING 1 | 70[μs] | ALTERNATIVE PROCESSING FOR PROCESSING 1 | 35[μs] |
| 2 | PROCESSING 2 | 120[μs] | ALTERNATIVE PROCESSING FOR PROCESSING 2 | 60[μs] |
| 3 | PROCESSING 3 | 200[μs] | ALTERNATIVE PROCESSING FOR PROCESSING 3 | 100[μs] |
| 4 | PROCESSING 4 | 120[μs] | ALTERNATIVE PROCESSING FOR PROCESSING 4 | 60[μs] |
| 5 | PROCESSING 5 | 100[μs] | ALTERNATIVE PROCESSING FOR PROCESSING 5 | 50[μs] |
| 6 | PROCESSING 6 | 20[μs] | ALTERNATIVE PROCESSING FOR PROCESSING 6 | 10[μs] |
| 7 | PROCESSING 7 | 30[μs] | ALTERNATIVE PROCESSING FOR PROCESSING 7 | 15[μs] |
| 8 | PROCESSING 8 | 300[μs] | ALTERNATIVE PROCESSING FOR PROCESSING 8 | 150[μs] |
| 9 | PROCESSING 9 | 50[μs] | ALTERNATIVE PROCESSING FOR PROCESSING 9 | 25[μs] |
| 10 | PROCESSING 10 | 10[μs] | ALTERNATIVE PROCESSING FOR PROCESSING 10 | 5[μs] |

FIG.11

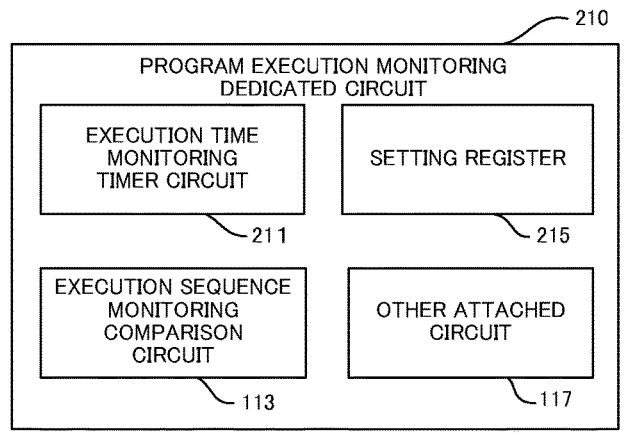

FIG.12

| EXECUTION SEQUENCE | PROCESSING ADDRESS | | EXECUTION TIME THRESHOLD |
|---|---|---|---|
| 1 | HEAD ADDRESS OF PROCESSING 1 | END ADDRESS OF PROCESSING 1 | 70[μs] |
| 2 | HEAD ADDRESS OF PROCESSING 2 | END ADDRESS OF PROCESSING 2 | 120[μs] |
| 3 | HEAD ADDRESS OF PROCESSING 3 | END ADDRESS OF PROCESSING 3 | 200[μs] |
| 4 | HEAD ADDRESS OF PROCESSING 4 | END ADDRESS OF PROCESSING 4 | 120[μs] |
| 5 | HEAD ADDRESS OF PROCESSING 5 | END ADDRESS OF PROCESSING 5 | 100[μs] |
| 6 | HEAD ADDRESS OF PROCESSING 6 | END ADDRESS OF PROCESSING 6 | 20[μs] |
| 7 | HEAD ADDRESS OF PROCESSING 7 | END ADDRESS OF PROCESSING 7 | 30[μs] |
| 8 | HEAD ADDRESS OF PROCESSING 8 | END ADDRESS OF PROCESSING 8 | 300[μs] |
| 9 | HEAD ADDRESS OF PROCESSING 9 | END ADDRESS OF PROCESSING 9 | 50[μs] |
| 10 | HEAD ADDRESS OF PROCESSING 10 | END ADDRESS OF PROCESSING 10 | 10[μs] |

FIG.14

| EXECUTION SEQUENCE | PROCESSING ADDRESS | | EXECUTION SEQUENCE MONITORING FLAG | EXECUTION TIME MONITORING FLAG | EXECUTION TIME THRESHOLD |
|---|---|---|---|---|---|
| 1 | HEAD ADDRESS OF PROCESSING 1 | END ADDRESS OF PROCESSING 1 | VALID | VALID | 70[μs] |
| 2 | HEAD ADDRESS OF PROCESSING 2 | END ADDRESS OF PROCESSING 2 | INVALID | VALID | 120[μs] |
| 3 | HEAD ADDRESS OF PROCESSING 3 | END ADDRESS OF PROCESSING 3 | VALID | VALID | 200[μs] |
| 4 | HEAD ADDRESS OF PROCESSING 4 | END ADDRESS OF PROCESSING 4 | VALID | VALID | 120[μs] |
| 5 | HEAD ADDRESS OF PROCESSING 5 | END ADDRESS OF PROCESSING 5 | VALID | INVALID | 100[μs] |
| 6 | HEAD ADDRESS OF PROCESSING 6 | END ADDRESS OF PROCESSING 6 | VALID | VALID | 20[μs] |
| 7 | HEAD ADDRESS OF PROCESSING 7 | END ADDRESS OF PROCESSING 7 | VALID | INVALID | 30[μs] |
| 8 | HEAD ADDRESS OF PROCESSING 8 | END ADDRESS OF PROCESSING 8 | VALID | VALID | 300[μs] |
| 9 | HEAD ADDRESS OF PROCESSING 9 | END ADDRESS OF PROCESSING 9 | INVALID | VALID | 50[μs] |
| 10 | HEAD ADDRESS OF PROCESSING 10 | END ADDRESS OF PROCESSING 10 | VALID | VALID | 10[μs] |

CONTROL APPARATUS AND CONTROL METHOD OF ON-VEHICLE ELECTRONIC EQUIPMENT

CROSS REFERENCE TO RELATED APPLICATIONS

This application is a National Stage of International Application No. PCT/JP2015/076625 filed Sep. 18, 2015, claiming priority based on International Patent Application No. PCT/JP2014/075396 filed Sep. 25, 2014 and Japanese Patent Application No. 2015-143875 filed Jul. 21, 2015, the contents of all of which are incorporated herein by reference in their entirety.

TECHNICAL FIELD

The present invention relates to a control apparatus and a control method of on-vehicle electronic equipment, and more specifically relates to the control apparatus that comprises a program execution monitoring dedicated circuit for monitoring an abnormal execution state of a control program of an electronic power steering apparatus controlled by the above control apparatus and the control method using the same.

BACKGROUND ART

Recently, computerization of vehicles has been progressing, various vehicle equipments, driving systems, auxiliary systems for the same, etc. are equipped with a number of electronic equipments, and the control of the electronic equipment is performed. Further, in a control apparatus for controlling such an on-vehicle electronic equipment, in order to realize a safe operation of the vehicle and improve the convenience and comfortability of vehicle occupants, high safety and reliability are required.

Therefore, in order to improve the safety and the reliability, even in the case that abnormality occurs in the control program of the electronic equipment, the control apparatus described above is, for example, provided with a watchdog timer (WDT), and repeats start-up and reset of the WDT at every predetermined time so that the abnormal execution state of the control program does not continue over a certain time.

Further, for example, in the case that the above electronic equipment is an electric power steering apparatus (EPS), as described in Patent Document 1 (Japanese Published Unexamined Patent Application No. 2009-113618 A), a technology that accurately detects the abnormal execution state of the control program being undetectable by the WDT described above by measuring termination time of each task in a control section and performing detection of the abnormal execution state of the control program based on measured termination time of each task, is disclosed.

Moreover, in Patent Document 2 (Japanese Published Unexamined Patent Application No. 2006-90356 A), a technology that suppresses the occurrence of faults such as task missing and so on by detecting a task with a high processing load in a control apparatus for vehicle control and replacing with processing contents with a lower processing load based on a predetermined task congestion criterion, is disclosed.

THE LIST OF PRIOR ART DOCUMENTS

Patent Documents

Patent Document 1: Japanese Published Unexamined Patent Application No. 2009-113618 A Patent Document 2: Japanese Published Unexamined Patent Application No. 2006-90356 A

SUMMARY OF THE INVENTION

Problems to be Solved by the Invention

However, in a conventional invention described in the Patent Document 1, although the abnormality detection is performed by performing an interruption, since it is impossible to perform the detection of the abnormal execution state until the termination of a plurality of tasks delimited by the predetermined time and an alternative processing is not performed even in the case of determining the abnormality, there is a problem that a steering assist by the electric power steering apparatus cannot be continued.

Further, in the conventional invention described in the Patent Document 2, although a task processing with a high processing load is performed after partly simplifying the task processing with the high processing load itself, like the case of the Patent Document 1, there is a problem that it is impossible to detect the abnormality when the task is not terminated.

Therefore, in order to solve the above problems, the object of the present invention is to provide a control apparatus and a control method that monitor an abnormal execution state of a control program of the electronic equipment controlled by the control apparatus of on-vehicle electronic equipment and are capable of continuously performing the control of the on-vehicle electronic equipment by performing an alternative processing when the above abnormal execution state is detected.

Means for Solving the Problems

In order to solve the above problems, the present invention provides a control apparatus of on-vehicle electronic equipment that a program execution monitoring dedicated circuit for monitoring an execution sequence and an execution time of a task executed by a control program of said on-vehicle electronic equipment is mounted on said control apparatus; wherein said program execution monitoring dedicated circuit is provided with at least an execution sequence monitoring comparison circuit, an execution time monitoring timer circuit and a setting register, wherein a head address, an end address and an execution time threshold of each of a plurality of said tasks are preliminarily registered with said setting register, wherein monitoring of said execution sequence of said task is performed by comparing said head address of said each task with a head address in command fetch by means of said execution sequence monitoring comparison circuit, wherein monitoring of said execution time is performed by comparing an execution time from said head address to said end address of said each task withsaid execution time threshold of its task by means of said execution time monitoring timer circuit, and wherein said program execution monitoring dedicated circuit continues a control of said on-vehicle electronic equipment by outputting a signal preliminarily set and performing an alternative processing in a case that said execution sequence of said task is different from a sequence preliminarily set or/and in a case that said execution time of said task exceeds a threshold preliminarily set.

Further, the solution of the above problems is more effectively achieved by that wherein said alternative processing performs any one processing of a processing that performs a task corresponding to a regular sequence, a processing that performs another task having a short execution time and preliminarily set, a processing that redoes from a previous task in which an abnormality occurs, or, a processing that redoes a whole process being executed depending on importance of a process and so on in said case that said execution sequence of said task is different from said sequence preliminarily set, and performs a processing preliminarily set for every task as substitute for said task in said case that said execution time of said task exceeds said threshold preliminarily set, and wherein said alternative processing is performed by an interruption to a CPU, and after said interruption by said alternative processing is passed through, said control of said on-vehicle electronic equipment can be continued by shifting to execution monitoring of said control program again; or by that wherein an execution sequence monitoring flag and an execution time monitoring flag are preliminarily set for each said task on said setting register, only a task of which said execution sequence monitoring flag is "valid" is made a subject of monitoring of said execution sequence, and only a task of which said execution time monitoring flag is "valid" is made a subject of monitoring of said execution time; or by that wherein an on-vehicle MCU is equipped with said program execution monitoring dedicated circuit; or by that wherein said on-vehicle electronic equipment is an electric power steering apparatus.

Further, in order to solve the above problems, the present invention provides a control method of on-vehicle electronic equipment that uses a program execution monitoring dedicated circuit for monitoring an execution sequence and an execution time of a task executed by a control program of an on-vehicle electronic equipment to monitor an execution state of said control program of said on-vehicle electronic equipment, wherein said program execution monitoring dedicated circuit is provided with at least an execution sequence monitoring comparison circuit, an execution time monitoring timer circuit and a setting register, wherein a head address, an end address and an execution time threshold of each of a plurality of said tasks are preliminarily registered with said setting register, wherein monitoring of said execution sequence of said task is performed by comparing said head address of said each task with a head address in command fetch by means of said execution sequence monitoring comparison circuit, wherein monitoring of said execution time is performed by comparing an execution time from said head address to said end address of said each task with said execution time threshold of its task by means of said execution time monitoring timer circuit, and wherein said program execution monitoring dedicated circuit continues a control of said on-vehicle electronic equipment by outputting a signal preliminarily set and performing an alternative processing in a case that said execution sequence of said task is different from a sequence preliminarily set or/and in a case that said execution time of said task exceeds a threshold preliminarily set.

Further, the solution of the above problems is more effectively achieved by that wherein said alternative processing performs any one processing of a processing that performs a task corresponding to a regular sequence, a processing that performs another task having a short execution time and preliminarily set, a processing that redoes from a previous task in which an abnormality occurs, or, a processing that redoes a whole process being executed depending on importance of a process and so on in said case that said execution sequence of said task is different from said sequence preliminarily set, and performs a processing preliminarily set for every task as substitute for said task in said case that said execution time of said task exceeds said threshold preliminarily set, and wherein said alternative processing is performed by an interruption to a CPU, and after said interruption by said alternative processing is passed through, said control of said on-vehicle electronic equipment can be continued by shifting to execution monitoring of said control program again; or by that wherein an execution sequence monitoring flag and an execution time monitoring flag are preliminarily set for each said task on said setting register, only a task of which said execution sequence monitoring flag is "valid" is made a subject of monitoring of said execution sequence, and only a task of which said execution time monitoring flag is "valid" is made a subject of monitoring of said execution time; or by that wherein an on-vehicle MCU is equipped with said program execution monitoring dedicated circuit; or by that wherein said on-vehicle electronic equipment is an electric power steering apparatus.

Effects of the Invention

According to the present invention, since the execution sequence and the execution time of each task performed by the program are monitored by the program execution monitoring dedicated circuit mounted on the above control apparatus, in comparison with the case of monitoring by software, it is possible to quickly monitor the abnormal execution state of the program.

Further, according to the present invention, in comparison with abnormality monitoring of the program using a conventional software and a WDT, since it is not necessary to wait for the termination of one task for the abnormality monitoring, it is possible to reduce a time from the occurrence of the abnormality to the abnormality detection and quickly perform fail-safe processing and so on.

Moreover, in the present invention, since it is possible to perform the alternative processing as the fail-safe processing, it is possible to continuously perform the control of the electronic equipment.

Accordingly, when the present invention is used for the control apparatus of the on-vehicle electronic equipment, safety and reliability are further improved, and, for example, in the case that the present invention is used for a control apparatus of an electric power steering apparatus mounted on a vehicle, even in the case that abnormality occurs in programs of the above control apparatus, it is possible to continuously perform the steering assist.

BRIEF DESCRIPTION OF THE DRAWINGS

In the accompanying drawings:

FIG. 4 is a diagram showing the configuration of a program execution monitoring dedicated circuit (a first embodiment) of the present invention;

FIG. 5 is a diagram showing a setting example (a first embodiment) of processing address and execution time threshold of a setting register with respect to a control process;

FIG. 6 is a diagram showing a setting example of the setting register with respect to normal processing and its execution time threshold, and alternative processing and its alternative processing's execution time threshold;

FIG. 11 is a diagram showing the configuration of a program execution monitoring dedicated circuit (a second embodiment) of the present invention;

FIG. 12 is a diagram showing a setting example (a second embodiment) of processing address and execution time threshold of a setting register with respect to a control process;

FIG. 14 is a diagram showing a setting example of a setting register having an execution sequence monitoring flag and an execution time monitoring flag.

MODE FOR CARRYING OUT THE INVENTION

Hereinafter, with respect to embodiments of the present invention, as an example, practical examples that the present invention is used for an electric power steering apparatus being on-vehicle electronic equipment will be described.

First, a first embodiment of the present invention will be described.

The electric power steering apparatus (EPS) provides a steering mechanism of a vehicle with a steering assist torque (an assist torque) by means of a rotational torque of a motor, and applies a driving force of the motor as the assist torque to a steering shaft or a rack shaft by means of a transmission mechanism such as gears or a belt through a reduction mechanism. Further, in order to accurately generate the steering assist torque, such an electric power steering apparatus performs a feedback control of a motor current.

Such feedback control adjusts a voltage supplied to the motor so that a difference between a steering assist command value (a current command value) and a detected motor current value becomes small, and the adjustment of the voltage applied to the motor is generally performed by an adjustment of duty of a pulse width modulation (PWM) control.

Figure 1:
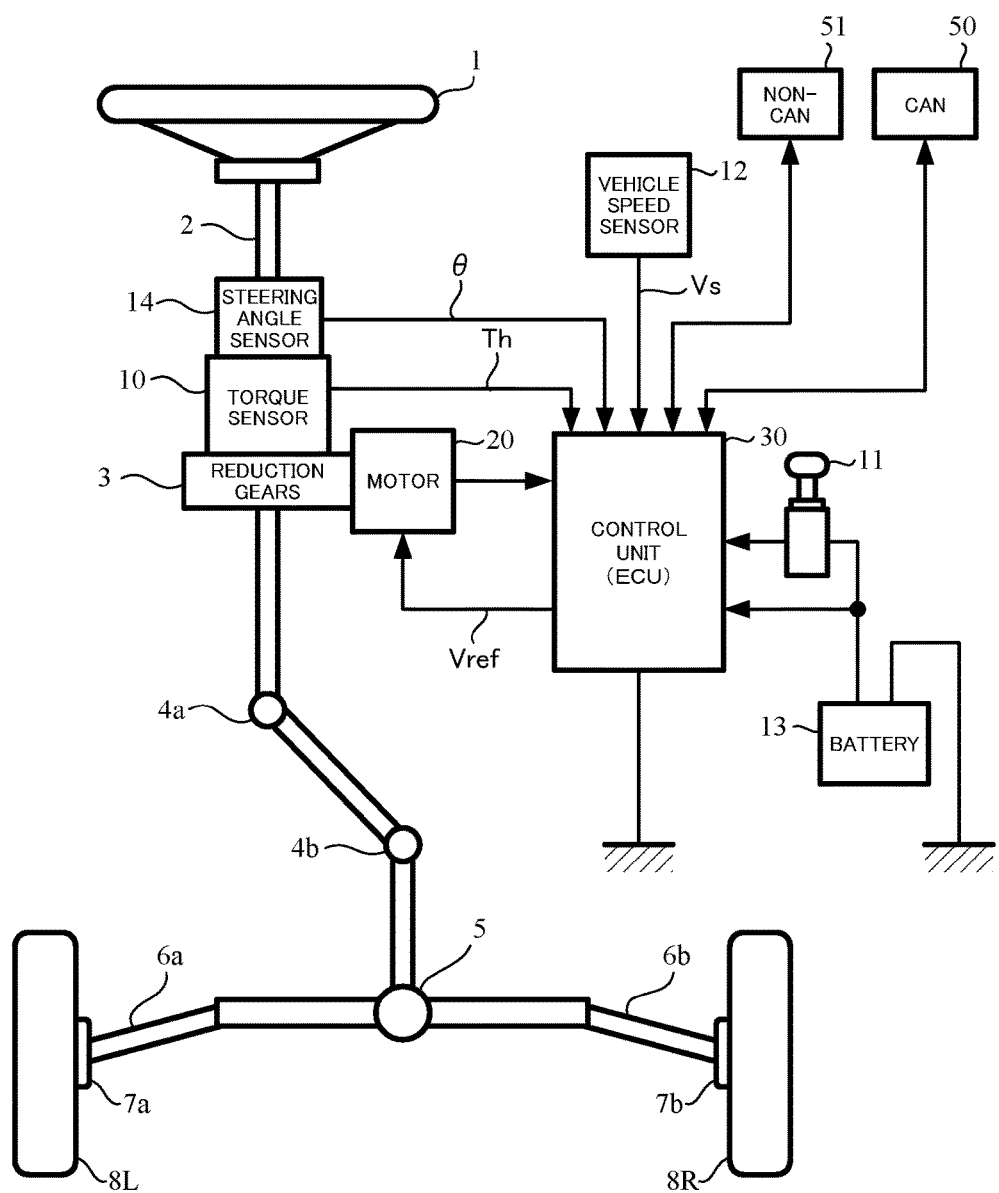
FIG. 1 is a diagram illustrating a general configuration of an electric power steering apparatus.

A general configuration of the electric power steering apparatus will be described with reference to FIG. 1. As shown in FIG. 1, a column shaft (a steering shaft, a handle shaft) 2 connected to a steering wheel (a handle) 1, is connected to steered wheels 8L and 8R through reduction gears as a reduction mechanism 3, universal joints 4a and 4b, a rack and pinion mechanism 5, and tie rods 6a and 6b, further via hub units 7a and 7b. Further, the column shaft 2 is provided with a torque sensor 10 for detecting a steering torque of the steering wheel 1 and a steering angle sensor 14 for detecting a steering angle θ, and a motor 20 for assisting the steering force of the steering wheel 1 is connected to the column shaft 2 through the reduction gears as the reduction mechanism 3.

Furthermore, a control unit (ECU) 30 for controlling the electric power steering apparatus is configured to use a micro control unit (MCU) 31 as its key component, electric power is supplied to the control unit 30 from a battery 13, and an ignition key signal is inputted into the control unit 30 through an ignition key 11.

The control unit (ECU) 30 having such configuration calculates a current command value of an assist (steering assist) command based on a steering torque Th detected by the torque sensor 10 and a vehicle speed Vel detected by a vehicle speed sensor 12, and controls a current supplied to the motor 20 based on a voltage control command value Vref obtained by performing compensation and so on with respect to the current command value. In addition, the steering angle sensor 14 is not a necessary element, it is also possible not to be provided with the steering angle sensor 14, and it is also possible to obtain a steering angle from a rotation position sensor such as a resolver connected to the motor 20.

Moreover, a controller area network (CAN) 50 for transmitting and receiving various kinds of information of the vehicle is connected to the control unit (ECU) 30, and it is also possible to receive the vehicle speed Vel from the CAN 50. Further, it is also possible to connect a non-CAN 51 for transmitting and receiving communications, analog/digital signals, electric waves and so on except the CAN 50 to the control unit (ECU) 30.

Figure 2:
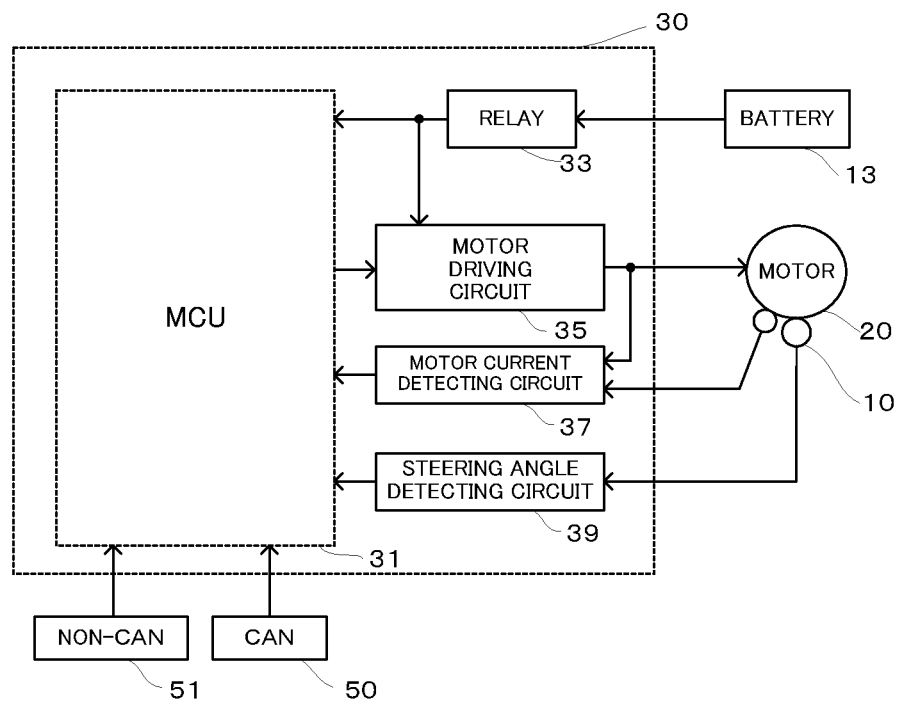
FIG. 2 is a diagram showing a basic configuration example of a control unit (ECU)

The control unit (ECU) 30 basically has a basic configuration shown in FIG. 2, and comprises the micro control unit (MCU) 31 equipped with a central processing unit (CPU), a motor driving circuit 35, a motor current detecting circuit 37, a steering angle detecting circuit 39, a relay 33 of a power supply and so on.

Figure 3:
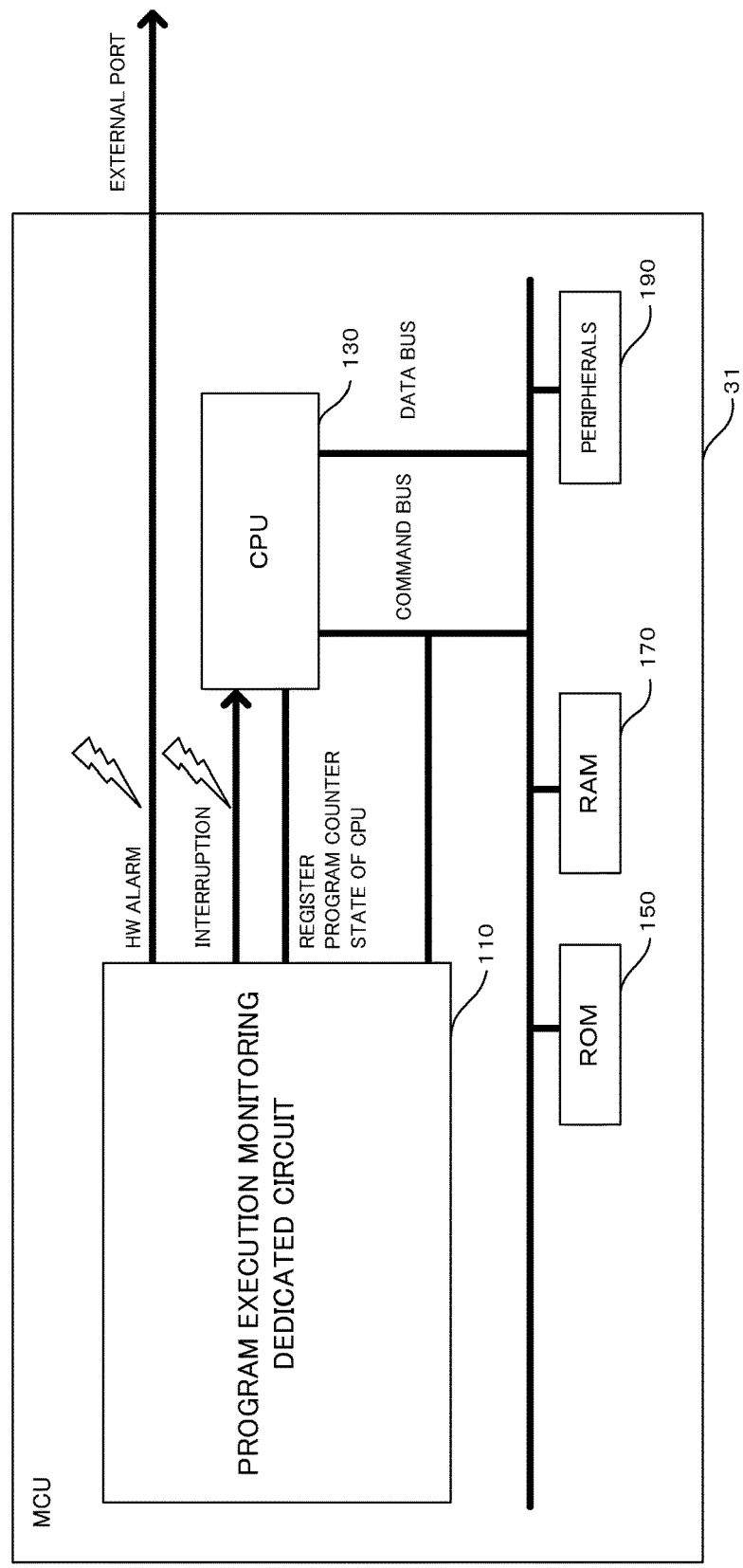
FIG. 3 is a diagram showing a schematic configuration of a micro control unit (MCU)

Furthermore, a program execution monitoring dedicated circuit 110 of the present embodiment is mounted within the MCU 31 of the control unit 30. FIG. 3 shows a schematic configuration of the MCU 31, the inside of MCU 31 comprises the program execution monitoring dedicated circuit 110 of the present embodiment, a CPU 130, a ROM (including an EEPROM, etc.) 150, a RAM 170, peripherals 190 including interfaces etc., and so on, and these are connected by data bus, command bus and so on. Further, here, a control program of the electric power steering apparatus being comprised of a plurality of processes, control data, etc. are stored in the ROM 150, the CPU 130 performs the control of the electric power steering apparatus by executing the above control program, and the RAM 170 functions also as a work memory when the CPU 130 operates. Further, information about a register, a program counter, a state of the CPU, etc. are transmitted between the CPU 130 and the program execution monitoring dedicated circuit 110 of the present embodiment, and moreover, a signal wire of interruption instruction to the CPU 130, a signal wire of a hardware (HW) alarm to an external port, etc. are connected from the program execution monitoring dedicated circuit 110.

Further, as shown in FIG. 4, the program execution monitoring dedicated circuit 110 of the present embodiment comprises an execution sequence monitoring comparison circuit 113, an execution time monitoring timer circuit 111, a setting register 115 and another attached circuit 117.

Specifically, the execution sequence monitoring comparison circuit 113 is a circuit that monitors whether a task (a processing) executed by the control program in the CPU 130 is performed in order or not, and is a circuit that monitors whether or not the processing is executed under a predetermined process, whether or not the most recent task is a proper task, and so on.

Further, the execution time monitoring timer circuit 111 is a circuit that monitors whether each processing is executed after the elapse of a time more than or equal to a certain threshold predetermined for every processing or not.

Further, the setting register 115 is a register that preliminarily records setting information used in the operation of the program execution monitoring dedicated circuit 110. For example, FIG. 5 is a setting example of the setting register 115 of the program execution monitoring dedicated circuit 110 within the MCU 31 with respect to a certain process. In FIG. 5, respective head addresses of a plurality of processings (for example, from a processing 1 to a processing n, where n=10) as processing address and execution time thresholds of the above each processing (from a processing 1 to a processing n, where n=10) are set. In addition, here, the processes mean a plurality of control procedures that configure the control program, for example, include a torque control process for calculating a steering assist torque command value based on a steering torque T and a vehicle speed V, a current control process for driving a steering assist motor 20 based on the steering assist torque command value, and so on. Basically, each process periodically executes a plurality of processings, and the number of the plurality of processings is different for every process. Further, as shown in FIG. 6, setting conditions such as the kind of the processing ordinarily performed by the program, an execution sequence thereof and an execution time threshold thereof, and the kind of the processing in the case that the program performs the alternative processing, the execution sequence thereof and the execution time threshold thereof are stored in the setting register 115.

Moreover, here, although the execution time threshold of the processing in the case of performing the alternative processing of FIG. 6 is set to half of the execution time threshold of the processing ordinarily performed, contents of the alternative processing and the execution time threshold of the alternative processing are an example and are not limited to this example. Therefore, it is also possible to supplement a plurality of normal processings with one alternative processing in some cases, and it is also possible to set the execution time threshold of the one alternative processing so as not to be limited to half of the execution time threshold of the processing ordinarily performed.

Further, the other attached circuit 117 is provided with a hardware (HW) timer, a timer counter, a comparison register etc., and is further provided with a generating circuit of the interruption processing and the HW alarm, a log register for storing the execution sequence and the execution time read from the CPU 130, the presence or absence of alternative processing execution etc., and so on as necessary.

In the program execution monitoring dedicated circuit 110 configured as described above, execution monitoring of the control program and necessary alternative processing are performed by the following execution procedure.

Basically, the monitoring of execution sequence is performed by obtaining information about that which program is currently executed based on processing addresses in command fetch and information about the program counter within the CPU etc., and comparing the obtained information with respective head addresses (processing addresses) of a plurality of processings (the processing 1 to the processing n) including a function pointer table etc. that are preliminarily registered in the setting register by means of the execution sequence monitoring comparison circuit 113 within the program execution monitoring dedicated circuit 110.

Figure 7:
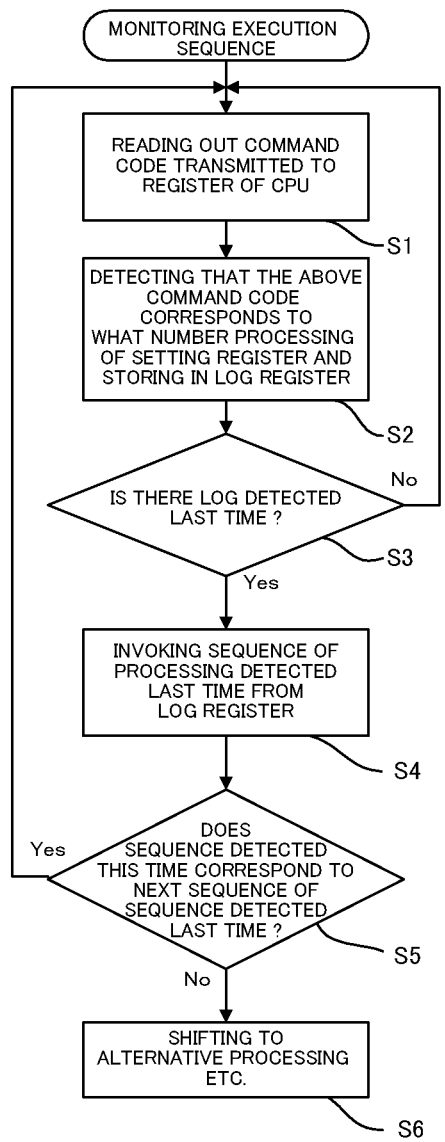
FIG. 7 is a flowchart showing the flow of execution sequence monitoring.

That is to say, when the CPU 130 executes a task, command codes etc. are read out from the ROM 150 and transmitted to the register within the CPU 130. Therefore, as shown in FIG. 7, the program execution monitoring dedicated circuit 110 reads out processing address of command code transmitted to the register of the CPU 130 and so on from the register within the CPU 130 or access information to the ROM 150 and so on (Step S1).

Then, as shown in FIG. 5, the processing address preliminarily registered in the setting register 115 within the program execution monitoring dedicated circuit 110 is compared with the processing address of command code and so on read out as above, and information about that processing having the same processing address exists in what number execution sequence (1 ton) among processing addresses registered in the setting register 115 is stored in the log register as log information (Step S2).

Next, the presence or absence of record of execution sequence of processing until the last time is detected from the log information of the log register (Step S3), return to the Step S1 in the absence of the record of execution sequence of processing until the last time, and shift to the next Step S4 in the presence of the record of execution sequence of processing.

In the next Step S4, information about that processing detected last time is what number execution sequence is fetched from the log information of the log register, and in the subsequent Step S5, it is judged whether or not execution sequence of processing detected this time corresponds to next execution sequence of processing detected last time.

Then, in the case of judging that the execution sequence of processing detected this time corresponds to a next execution sequence of processing detected last time and there is no abnormality in the sequence of processing by the above Step S5, return to the Step S1. On the other hand, in the case of judging that there is an abnormality in the sequence of processing, shift to the next Step S6 that performs the generation of the HW alarm and the alternative processing and so on.

As the above alternative processing, for example, it is possible to perform interruption with respect to the CPU 130 and, as shown in FIG. 6, based on the sequence of current processing, perform a regular processing or an alternative processing corresponding to that sequence, and it is also possible to choose what kind of processing such as a processing that returns a whole process being executed to its initial state and redoes the execution of a series of processing, and a processing that redoes from a previous processing in which the abnormality occurs based on the log information etc., depending on the importance of process and so on. Further, in order to eliminate a possibility that abnormality occurs in the same processing over and over again and the processing falls into an infinite loop, it is also possible to record a log of abnormality information in the log register, in the case of detecting an identical abnormality over and over again, limit the number of times of the monitoring of execution sequence, and in some cases, perform an alternative processing such as a processing that skips the processing in which faults occur. Then, after shifting to the alternative processing as described above and the executing the alternative processing, shift to the monitoring of the execution sequence of the program again.

As described above, in the execution sequence monitoring comparison circuit 113 within the program execution monitoring dedicated circuit 110 of the present embodiment, although the monitoring of execution sequence of the above control program is performed based on respective head addresses (processing addresses) of a plurality of processings (the processing 1 to the processing n), for example, in the program execution monitoring of the present embodiment, it is also possible to employ a configuration and a method that read execution sequence of each process from the program counter of the CPU 130, compare with the processing address preliminarily registered in the setting register within the program execution monitoring dedicated circuit 110, and monitor the validity of selection of process itself and so on.

Next, in the program execution monitoring dedicated circuit 110 of the present embodiment, with respect to a case of performing the monitoring of the execution time of the above control program and the alternative processing, the execution procedure will be described.

In the program execution monitoring dedicated circuit 110 of the present embodiment, as already described with respect to FIG. 5, each process configuring the control program is subdivided for every processing, with respect to each processing (the processing 1 to the processing n), the execution time threshold for the execution time monitoring is set and stored in the setting register 115. Then, as shown in FIG. 6, with respect to the above each processing, an alternative processing is set so as to pair up the alternative processing with the above each processing, further, with respect to the alternative processing, the execution time threshold is set and stored in the setting register 115 similarly.

Figure 8:
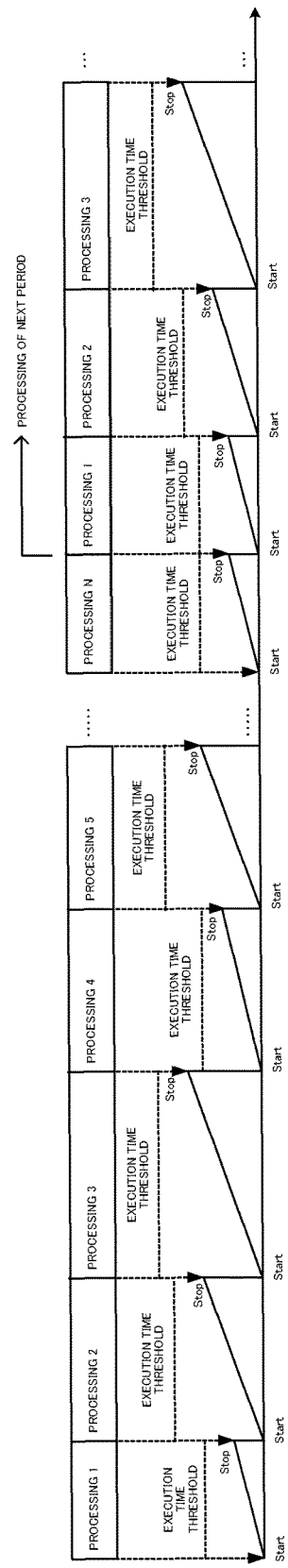
FIG. 8 is a conceptual diagram showing a measurement example in the case that abnormality does not occur in execution time.

FIG. 8 is a conceptual diagram showing a measurement example in the case that with respect to the above plurality of processings n (processing n: where 1≤n≤N), the execution time of the processing does not exceed the predetermined execution time threshold, that is, in the case that abnormality does not occur in execution time of the processing by the CPU 130, and the operation of the execution time monitoring timer circuit 111 of the present embodiment matching that.

Here, a horizontal axis shows the flow of a plurality of processings, FIG. 8 also shows a case of further shifting to the same processing in the next period in the case of setting the number of a plurality of processings of one process to "N". Further, a vertical axis shows a program counter value or the execution time that has elapsed for every processing. Therefore, a rising hatched line from the bottom left to the top right indicated by a solid line for every processing represents the elapse of time for the every processing, and a chain line similarly indicated for every processing shows the execution time threshold set for every processing.

As shown in FIG. 8, in the execution time monitoring timer circuit 111, when each processing n is started, at the same, the monitoring of the execution time by the execution time monitoring timer circuit 111 starts. In addition, here, the above monitoring of execution time is performed by means of a timer within the program execution monitoring dedicated circuit. Further, with respect to the above time measurement, it is also possible to perform a mutual conversion between a timer counter value of the program execution monitoring dedicated circuit 110 and a calculation value of a real time based on the timer counter value of the program execution monitoring dedicated circuit 110 and then use these.

Next, in the execution time monitoring timer circuit 111, the elapse of the execution time is measured, at the same, a comparison with the execution time threshold preliminarily set for that processing and described in FIGS. 5 and 6 is performed, and in the case that each processing is terminated before an elapsed time for the above each processing (the rising solid line from the bottom left to the top right in FIG. 8), that is, the execution time reaches the execution time threshold preliminarily set for each processing (the chain line of a horizontal direction shown in FIG. 8), the monitoring of the execution time by the execution time monitoring timer circuit 111 is stopped.

Moreover, in the case that the execution time is normal as mentioned above, N processings configuring one process are repeated in the same way, and then shift to the next process or the processing of the next period. Further, it is possible to automatically perform all of the above processings based on information preliminarily set by means of the program execution monitoring dedicated circuit 110. In addition, in the above monitoring of the execution time, the setting information such as the execution time threshold for the above each processing and so on is preliminarily inputted into the setting register 115 or the like, read and used as necessary, and it is also possible that a synchronization between the hardware timer of the program execution monitoring dedicated circuit 110 and a clock of the CPU is preliminarily taken as necessary.

On the other hand, although FIG. 9 is a diagram configured in the same way as mentioned above, FIG. 9 differs from the case of FIG. 8 and is a conceptual diagram showing a measurement example in the case that abnormality occurs in execution time and the operation of the execution time monitoring timer circuit 111 of the present embodiment matching that.

Figure 9:
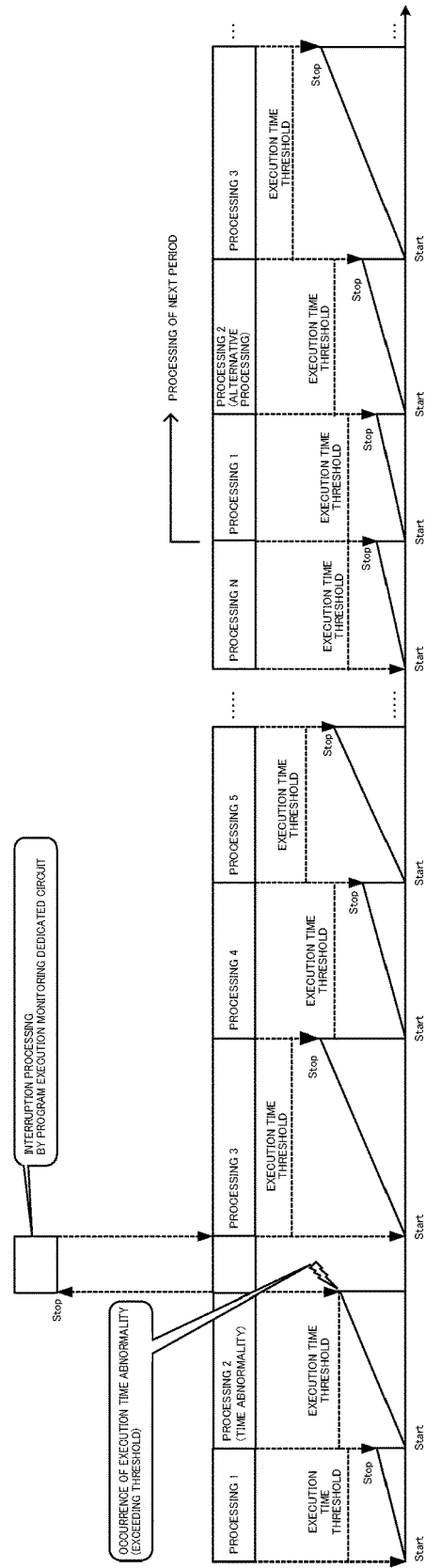
FIG. 9 is a conceptual diagram showing a measurement example in the case that abnormality occurs in execution time.

As shown in FIG. 9, like the case shown in FIG. 8, in the execution time monitoring timer circuit 111, when each processing n is started, at the same, the monitoring of execution time by the execution time monitoring timer circuit 111 starts.

Then, in the execution time monitoring timer circuit 111, in the same way as mentioned above, the elapse of the execution time is measured, at the same, a comparison with the execution time threshold preliminarily set for that processing is performed, and whether an elapsed time for the above each processing (a rising solid line from the bottom left to the top right in FIG. 9), that is, the execution time reaches the execution time threshold preliminarily set for each processing (a chain line of a horizontal direction shown in FIG. 9) or not is monitored.

Next, for example, as shown in the processing 2 of FIG. 9, in the case that the execution time of the processing reaches a preliminarily set execution time threshold, an interruption is informed to the CPU 130 by means of the program execution monitoring dedicated circuit as the occurrence of the abnormality in the execution time and then an interruption processing is performed.

The above interruption processing is a processing that replaces the processing where it is determined that the above abnormality occurs with an alternative processing and executes the alternative processing. Therefore, for example, in the case of the processing 2 of FIG. 9, as shown in FIG. 6, when the processing execution time of the processing 2 reaches 120 [μs] and it is judged that there is an abnormality in the execution time, the above processing 2 is properly stopped and the alternative processing for the processing 2 is performed by the interruption. In addition, here, the interruption processing itself is a processing by software.

Then, in the case that the above alternative processing is terminated and the interruption is passed through, as shown in FIG. 9, shift to the next processing 3 and shift to a normal monitoring state. Further, the processing instead of which the alternative processing is performed as mentioned above is executed in the processing of the next period after replacing the processing with the alternative processing.

Therefore, for example, with respect to the above processing 2, as shown in FIG. 9, it is also possible that in the next execution period of the process, the alternative processing for the processing 2 is performed from the beginning, and the monitoring of the execution time by the program execution monitoring dedicated circuit 110 is performed based on an alternative processing's execution time threshold shown in such as FIG. 6 that is provided for the alternative processing.

Next, with respect to one of processings shown in FIG. 9 (for example, processing N), the flow of the processing in the execution time monitoring timer circuit 111 in the case that the execution time of the processing exceeds the predetermined execution time threshold, that is, in the case that the abnormality occurs will be described with reference to FIG. 10.

Like the case of FIG. 9 and so on, in the case that the processing of the processing N in the CPU 130 is not terminated within a time set by the execution time threshold (in the case that the execution time becomes equal to the execution time threshold), since a timer stop of the execution time monitoring timer circuit 111 is not performed, a timeout occurs and the interruption processing is performed.

Figure 10:
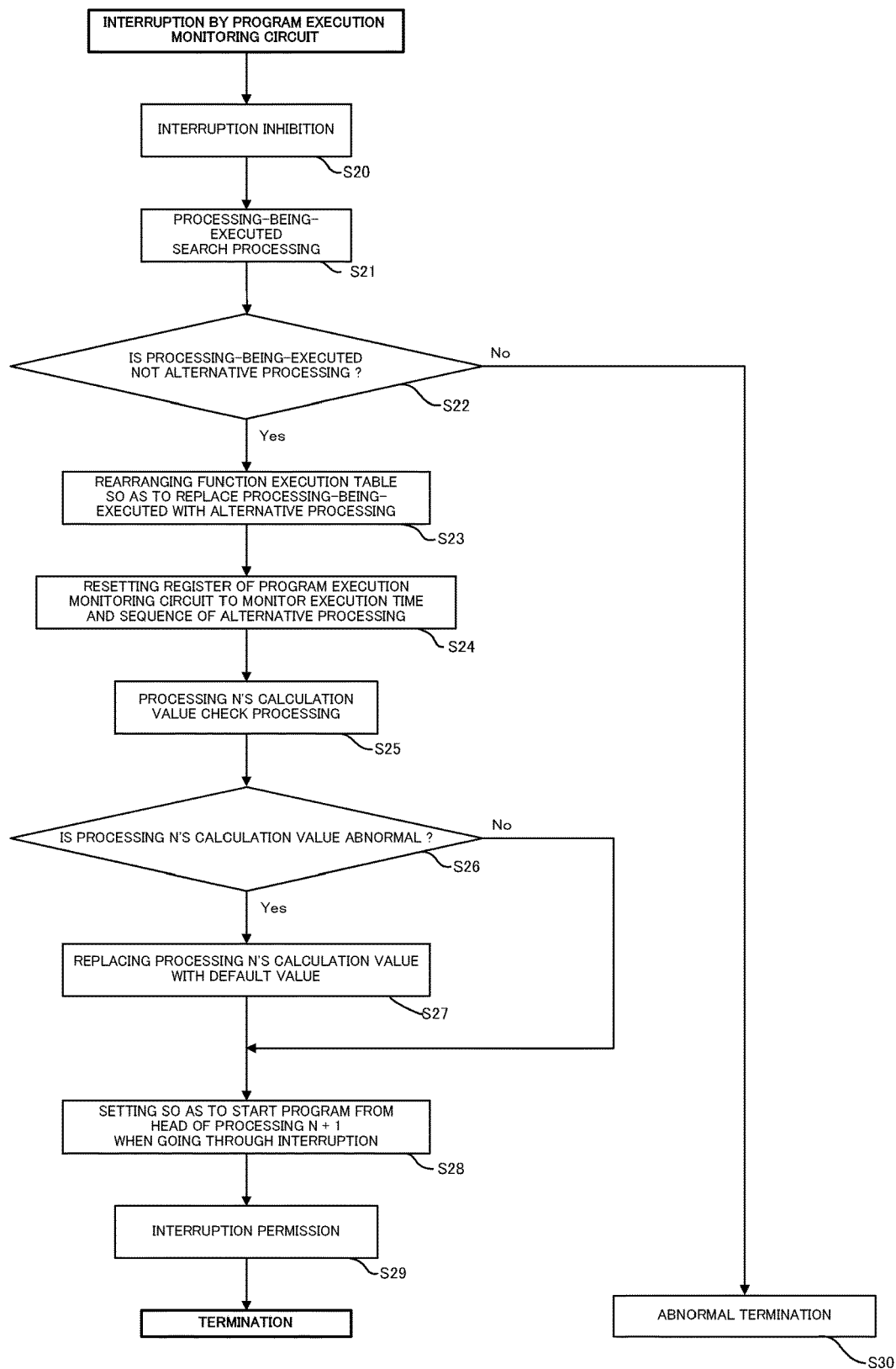
FIG. 10 is a flowchart showing the flow of an interruption processing in the case that abnormality occurs in execution time.

FIG. 10 is a flowchart showing a general outline of the flow of such an interruption processing.

In the above interruption processing, at first, an interruption inhibition processing is performed (Step S20). This is to prevent a matter that during the operation of the interruption based on an instruction by the program execution monitoring dedicated circuit, further, another interruption is instructed to the CPU 130 and a multi-interruption occurs.

Then, after performing the above interruption inhibition, a processing-being-executed search processing is performed (Step S21).

This is to read out information about that the processing where the interruption is performed is what number processing among processings described in such as FIG. 6 from the setting register 115 or the like and concurrently, also obtain information for performing a judgment on whether the processing is not the alternative processing.

A determination on whether the processing-being-executed where the interruption is performed is not an alternative processing, is performed based on the above information read (Step S22). This is to eliminate a possibility that the processing falls into an infinite loop because the same alternative processing is further performed in the case that the above processing-being-executed is an alternative processing. Therefore, in the case of determining that the processing-being-executed is an alternative processing by the above determination, the interruption processing is terminated as the abnormal termination, and a signal for actuating the hardware alarm or the like is outputted to the external port (Step S30). On the other hand, in the case of determining that the processing-being-executed is not an alternative processing, shift to the next Step S23.

The Step S23 is a processing that rearranges contents such as command codes and function execution tables of the CPU 130 so as to replace the processing-being-executed with an alternative processing. Since the above alternative processing is preliminarily set for each processing as described in FIG. 6, the rearrangement is performed based on the above setting.

Further, the Step S24 is a step that performs reset of the setting register 115 or the like of the program execution monitoring dedicated circuit 110 to monitor the execution time and the sequence of alternative processing. Therefore, here, information such as processing address of the next processing of the processing-being-executed, and processing address and alternative processing's execution time threshold of the alternative processing are recorded in the setting register 115 or the like for later reference.

When the above alternative processing is performed, a processing N's calculation value check processing is performed (Step S25). This is a matter that performs a judgment on whether the calculation value of the processing N where the alternative processing is performed, is abnormal or not (Step S26), and that judgment is performed by whether or not the calculation value of the processing N based on the alternative processing is within a predetermined threshold that is preliminarily set and so on. Then, in the case of judging that there is an abnormality in the above calculation value of the processing N, the calculation value of the processing N is replaced with a default value (Step S27), and in the case of judging that there is no abnormality in the above calculation value of the processing N, shift to the Step S28.

The Step S28 sets the program counter of the CPU 130 to head of a processing "N+1", performs an instruction for permitting other interruptions inhibited by the Step S20 (Step S29), and terminates the interruption by the program execution monitoring dedicated circuit.

In the present embodiment, by performing the monitoring of the execution time as described above, in the case that the execution time of the processing N exceeds the predetermined execution time threshold, it is possible to perform the continuation of control without stopping the execution of the program by performing the alternative processing. Then, in the present embodiment, the execution monitoring of the above program is performed by the program execution monitoring dedicated circuit mounted in the inside of the MCU, it is possible for the program execution monitoring dedicated circuit to know which program is currently executed based on the information such as command fetch addresses from the command bus and the program counter within the CPU, and concurrently by this, when head addresses and upper limit thresholds of the execution time of the processing 1 to the processing N are preliminarily registered in the setting register, it is possible to almost automatically measure the execution time by means of the timer within the program execution monitoring dedicated circuit.

A second embodiment of the present invention will be described.

Compared with the first embodiment, the second embodiment, as shown in FIG. 11, has changes in an execution time monitoring timer circuit 211 and a setting register 215 configuring a program execution monitoring dedicated circuit 210. There is no change in other configurations, which are the same as for the first embodiment.

An end address in addition to the head address of each processing is, as shown in FIG. 12, set to the setting register 215 as processing address. The execution time monitoring timer circuit 211 detects a termination of each processing when execution of each processing reaches its own end address.

Monitoring the execution sequence of the control program and execution of alternative processings in the second embodiment are the same as for the first embodiment. However, the head address is equal to the processing address because only the head address of each processing is set to the processing address in the first embodiment, on the other hand, the second embodiment performs execution monitoring of the control program with reference to the head address in the processing address since the end address of each processing is also set to the processing address in the second embodiment.

Monitoring the execution time of the control program and execution of necessary alternative processings in the second embodiment are the same as for the first embodiment except to detect termination of each processing using the end address set to each processing as mentioned above.

Figure 13:
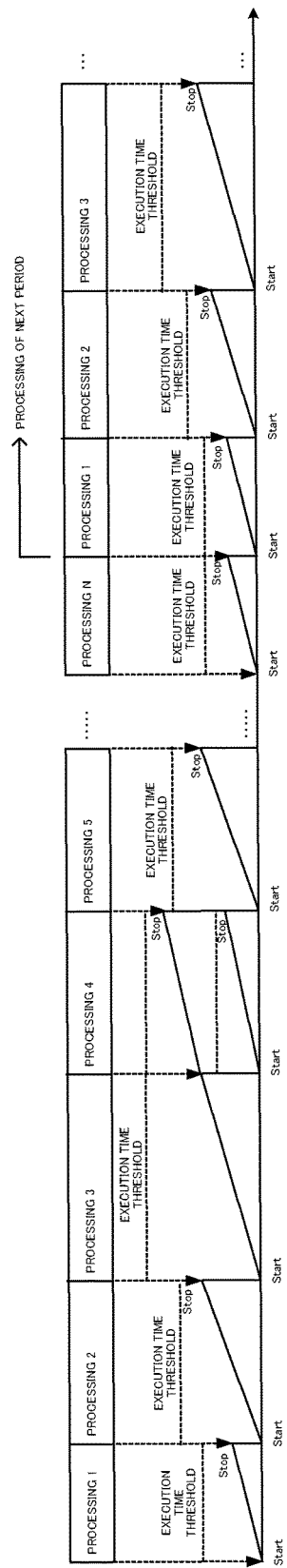
FIG. 13 is a conceptual diagram showing a measurement example in the case of monitoring execution time from a processing n to a processing n+1.

In this way, the execution time monitoring timer circuit 211 detects termination of each processing on the basis of the end address of each processing stored in the setting register 215. Therefore, a circuit that judges termination of a previous processing by start of a next processing is not capable of monitoring, for example, total execution time from a processing n to a processing n+1, the execution time monitoring timer circuit 211 is, however, capable of monitoring the total execution time from the processing n to the processing n+1 by setting the end address of the processing n+1 to the end address of the processing n. For example, in the case of monitoring execution time from the processing 3 to the processing 4 in FIG. 8, setting the end address of the processing 4 to the end address of the processing 3 causes the operation shown in FIG. 13, and it is possible to monitor the execution time from the processing 3 to the processing 4.

Further, in the case of monitoring only the execution time of one processing, execution time of such discontinuous processings as a processing n and a processing n+2, or the like, it is also possible to monitoring them by using an end address of each processing.

It is also possible to set, for example, an execution sequence monitoring flag and an execution time monitoring flag as shown in FIG. 14 to each processing of the setting register 215 within the program execution monitoring dedicated circuit 210 in the second embodiment. The execution sequence monitoring flag shows whether or not the processing is made a subject whose execution sequence is monitored. A processing whose execution sequence monitoring flag is "valid" is made the subject whose execution sequence is monitored, and a processing whose execution sequence monitoring flag is "invalid" is not made the subject. The execution time monitoring flag shows whether or not the processing is made a subject whose execution time is monitored. A processing whose execution time monitoring flag is "valid" is made the subject whose execution time is monitored, and a processing whose execution time monitoring flag is "invalid" is not made the subject.

In comparing a head address of a command code or the like with the head address registered with the setting register 215, the monitoring of the execution sequence using the execution sequence monitoring flag performs comparison with only the head addresses of processings whose execution sequence monitoring flags are "valid", and skip of the head addresses of processings whose execution sequence monitoring flags are "invalid". It is necessary to match arrangement of processings registered with the setting register 215 with sequence of normal processings in order to enable such monitoring. In FIG. 14, for example, processings are performed in order of "a processing 1", "a processing 3", . . .

In monitoring the execution time using the execution time monitoring flag, the monitoring of the execution time starts when a processing whose execution time monitoring flag is "valid" starts.

Using the execution sequence monitoring flag and the execution time monitoring flag enables flexible monitoring such as monitoring of only the necessary processings or the important processings.

Moreover, the above embodiments (the first embodiment and the second embodiment) of the present invention exemplify practical examples of the present invention, and the present invention is not limited to the above embodiments. Therefore, unless contrary to the general meaning of the present invention, the present invention can be carried out by various configurations.

For example, with respect to the monitoring of the execution time as described above, it is also possible to employ a configuration that considers the delay in processing caused by other interruptions. Therefore, in the case of using a general-purpose interruption processing in situations such as at the time of obtaining sensor information and so on, in the case of not wanting to include interruption processing time in the processing N, it is possible to implement a scheme so as to stop (maintain) a timer counter of the execution time while hardware obtains information of the CPU and performs an interruption, or, it is also possible to enable stopping the timer counter, or, whether or not continuing the timer counter during the interruption to be chosen.

Further, in order to measure the execution time within the interruption processing, it is also possible to configure the setting register to be divided according to the normal processing (periodic processing) and the interruption processing.

As described above, according to the control apparatus and the control method of on-vehicle electronic equipment of the present invention, it is possible to monitor the abnormal execution state of the control program of the on-vehicle electronic equipment as described above and continuously perform the control by performing the alternative processing when the above abnormal execution state is detected.

Therefore, for example, in the case that the control apparatus and the control method of on-vehicle electronic equipment of the present invention are used in the control of the electric power steering apparatus, even in the case of judging that abnormality occurs in the control apparatus thereof, it is possible to continuously perform the steering assist.

EXPLANATION OF REFERENCE NUMERALS 1 steering wheel
2 column shaft (steering shaft, handle shaft)
3 reduction mechanism
4a, 4b universal joint
5 rack and pinion mechanism
6a, 6b tie rod
7a, 7b hub unit
8L, 8R steered wheel
10 torque sensor
11 ignition key
12 vehicle speed sensor
13 battery
14 steering angle sensor
20 motor
30 control unit (ECU)
31 micro control unit (MCU)
33 relay
35 motor driving circuit
37 motor current detecting circuit
39 steering angle detecting circuit 110, 210 program execution monitoring dedicated circuit
111, 211 execution time monitoring timer circuit
113 execution sequence monitoring comparison circuit
115, 215 setting register
117 other attached circuit
130 CPU
150 ROM
170 RAM
190 peripherals

The invention claimed is:

1. A control apparatus of on-vehicle electronic equipment comprising:
 a program execution monitoring dedicated circuit which monitors an execution sequence and an execution time of a task executed by a control program of said on-vehicle electronic equipment,
 wherein said program execution monitoring dedicated circuit comprises at least an execution sequence monitoring comparison circuit, an execution time monitoring timer circuit and a setting register,
 wherein a head address, an end address and an execution time threshold of each of a plurality of said tasks are preliminarily registered with said setting register,
 wherein monitoring of said execution sequence of said task is performed by comparing said head address of said each task with a head address in command fetch by means of said execution sequence monitoring comparison circuit,
 wherein monitoring of said execution time is performed by comparing an execution time from said head address to said end address of said each task with said execution time threshold of its task by means of said execution time monitoring timer circuit, and
 wherein said program execution monitoring dedicated circuit continues a control of said on-vehicle electronic equipment by outputting a signal preliminarily set and performing an alternative processing to said task, wherein the alternative processing is a substitute for said task and comprises at least one operation or a part in the execution sequence different from the task, in a case at least one of said execution sequence of said task is different from a sequence preliminarily set and said execution time of said task exceeds a threshold preliminarily set.

2. The control apparatus of on-vehicle electronic equipment according to claim 1,
 wherein said alternative processing performs any one processing of:
 a processing that performs a task corresponding to a regular sequence,
 a processing that performs another task having a short execution time and preliminarily set,
 a processing that redoes from a previous task in which an abnormality occurs, or,
 a processing that redoes a whole process being executed depending on importance of a process and so on in said case that said execution sequence of said task is different from said sequence preliminarily set,
 wherein the alternative processing further performs a processing preliminarily set for every task as substitute for said task in said case that said execution time of said task exceeds said threshold preliminarily set, and
 wherein said alternative processing is performed by an interruption to a CPU, and after said interruption by said alternative processing is passed through, said control of said on-vehicle electronic equipment can be continued by shifting to execution monitoring of said control program again.

3. The control apparatus of on-vehicle electronic equipment according to claim 2,
 wherein an execution sequence monitoring flag and an execution time monitoring flag are preliminarily set for each said task on said setting register,
 only a task of which said execution sequence monitoring flag is set to valid is made a subject of monitoring of said execution sequence, and
 only a task of which said execution time monitoring flag is set to valid is made a subject of monitoring of said execution time.

4. The control apparatus of on-vehicle electronic equipment according to claim 2,
 wherein an on-vehicle MCU is equipped with said program execution monitoring dedicated circuit.

5. The control apparatus of on-vehicle electronic equipment according to claim 2,
 wherein said on-vehicle electronic equipment is an electric power steering apparatus.

6. The control apparatus of on-vehicle electronic equipment according to claim 1,
 wherein an execution sequence monitoring flag and an execution time monitoring flag are preliminarily set for each said task on said setting register,
 only a task of which said execution sequence monitoring flag is set to valid is made a subject of monitoring of said execution sequence, and
 only a task of which said execution time monitoring flag is set to valid is made a subject of monitoring of said execution time.

7. The control apparatus of on-vehicle electronic equipment according to claim 6,
 wherein an on-vehicle MCU is equipped with said program execution monitoring dedicated circuit.

8. The control apparatus of on-vehicle electronic equipment according to claim 6,
 wherein said on-vehicle electronic equipment is an electric power steering apparatus.

9. The control apparatus of on-vehicle electronic equipment according to claim 1,
 wherein an on-vehicle MCU is equipped with said program execution monitoring dedicated circuit.

10. The control apparatus of on-vehicle electronic equipment according to claim 1,
 wherein said on-vehicle electronic equipment is an electric power steering apparatus.

11. A control method of on-vehicle electronic equipment comprising:
 monitoring, by a program execution monitoring dedicated circuit, an execution sequence and an execution time of a task executed by a control program of an on-vehicle electronic equipment to monitor an execution state of said control program of said on-vehicle electronic equipment, wherein said program execution monitoring dedicated circuit comprises at least an execution sequence monitoring comparison circuit, an execution time monitoring timer circuit and a setting register,
 wherein a head address, an end address and an execution time threshold of each of a plurality of said tasks are preliminarily registered with said setting register,
 wherein the monitoring of said execution sequence of said task comprises comparing said head address of said each task with a head address in command fetch by said execution sequence monitoring comparison circuit, wherein the monitoring of said execution time further comprises comparing an execution time from said head address to said end address of said each task with said execution time threshold of a respective task by said execution time monitoring timer circuit, and wherein the method further comprises continuing, by said program execution monitoring dedicated circuit, a control of said on-vehicle electronic equipment by outputting a signal preliminarily set and performing an alternative processing to said task, wherein the alternative processing is a substitute to said task and comprises at least one operation or a part in an execution sequence different from the task, in a case of at least one of said execution sequence of said task is different from a sequence preliminarily set and said execution time of said task exceeds a threshold preliminarily set.

12. The control method of on-vehicle electronic equipment according to claim 11, wherein said alternative processing performs any one processing of:
 a processing that performs a task corresponding to a regular sequence,
 a processing that performs another task having a short execution time and preliminarily set,
 a processing that redoes from a previous task in which an abnormality occurs, or,
 a processing that redoes a whole process being executed depending on importance of a process and so on in said case that said execution sequence of said task is different from said sequence preliminarily set, wherein the alternative processing further performs a processing preliminarily set for every task as substitute for said task in said case that said execution time of said task exceeds said threshold preliminarily set, and wherein said alternative processing is performed by an interruption to a CPU, and after said interruption by said alternative processing is passed through, said control of said on-vehicle electronic equipment can be continued by shifting to execution monitoring of said control program again.

13. The control method of on-vehicle electronic equipment according to claim 12, wherein an execution sequence monitoring flag and an execution time monitoring flag are preliminarily set for each said task on said setting register, only a task of which said execution sequence monitoring flag is set to valid is made a subject of monitoring of said execution sequence, and only a task of which said execution time monitoring flag is set to valid is made a subject of monitoring of said execution time.

14. The control method of on-vehicle electronic equipment according to claim 12, wherein an on-vehicle MCU is equipped with said program execution monitoring dedicated circuit.

15. The control method of on-vehicle electronic equipment according to claim 12, wherein said on-vehicle electronic equipment is an electric power steering apparatus.

16. The control method of on-vehicle electronic equipment according to claim 11, wherein an execution sequence monitoring flag and an execution time monitoring flag are preliminarily set for each said task on said setting register, only a task of which said execution sequence monitoring flag is set to valid is made a subject of monitoring of said execution sequence, and only a task of which said execution time monitoring flag is set to valid is made a subject of monitoring of said execution time.

17. The control method of on-vehicle electronic equipment according to claim 16, wherein an on-vehicle MCU is equipped with said program execution monitoring dedicated circuit.

18. The control method of on-vehicle electronic equipment according to claim 16, wherein said on-vehicle electronic equipment is an electric power steering apparatus.

19. The control method of on-vehicle electronic equipment according to claim 11, wherein an on-vehicle MCU is equipped with said program execution monitoring dedicated circuit.

20. The control method of on-vehicle electronic equipment according to claim 11, wherein said on-vehicle electronic equipment is an electric power steering apparatus.

* * * * *